US007356516B2

(12) United States Patent
Richey et al.

(10) Patent No.: US 7,356,516 B2
(45) Date of Patent: Apr. 8, 2008

(54) METHOD AND SYSTEM FOR FACILITATING ELECTRONIC DISPUTE RESOLUTION

(75) Inventors: David Richey, Hayward, CA (US);
Marie King, San Carlos, CA (US);
Lisa Bernhard, Foster City, CA (US);
David Van Horn, Danville, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 10/172,762

(22) Filed: Jun. 13, 2002

(65) Prior Publication Data
US 2003/0233292 A1   Dec. 18, 2003

(51) Int. Cl.
*G06Q 99/00* (2006.01)
(52) U.S. Cl. .................. 705/80; 705/1; 705/8; 705/30; 705/16
(58) Field of Classification Search .................. 705/30, 705/33, 35, 39, 40, 44, 7, 8, 16, 21, 80, 1
See application file for complete search history.

(56) References Cited

U.S. PATENT DOCUMENTS 4,065,862 A    1/1978   Meyer (Continued)

FOREIGN PATENT DOCUMENTS

JP        02002063302 A  *  2/2002

OTHER PUBLICATIONS

White, Ron, How Computers Work, Millennium Ed. Que Corporation, Sep. 1999.*

(Continued)

*Primary Examiner*—Pierre Eddy Elisca
(74) *Attorney, Agent, or Firm*—Townsend and Townsend and Crew LLP

(57) ABSTRACT

A system for facilitating payment transaction disputes is provided. According to one aspect of the system, a user, such as an issuer, is allowed to use the system to resolve a disputed transaction. Based on information provided by a cardholder, the issuer is able to use the system to retrieve transactional information relating to the disputed transaction reported by the customer for review. When the issuer uses the system to retrieve information relating to the disputed transaction, a case folder is created. The case folder is a repository for storing all the relevant information and documentation relating to the disputed transaction. Using the information retrieved by the system, the issuer then determines whether to initiate a dispute. Alternatively, the system can also be used by an acquirer to respond to a dispute, usually on behalf of one of its merchant. If a dispute is responded to, a questionnaire is then created by the system. Alternatively, the issuer may decline to initiate a dispute and either seek additional information from the cardholder or deny the cardholder's inquiry. The case folder and the questionnaire are created for a specific disputed transaction. The questionnaire is designed to capture information from the cardholder and/or the issuer relating to the disputed transaction. The questionnaire may be pre-populated with previously retrieved transactional information which is stored in the case folder. Relevant documents in support of the disputed transaction may also be attached as part of the questionnaire. Various parties to the dispute may then provide relevant information (including supporting documentation) to the system. The relevant information provided by the parties is maintained in the case folder. The system then keeps track of the relevant timeframes for the case folder to ensure that each party to the dispute is given the correct period of time to respond during the processing of a dispute. Prior to filing the dispute for arbitration or compliance, the system permits the parties to resolve the dispute amongst themselves without the help of an arbiter through pre-arbitration and pre-compliance. If the parties to the dispute are unable to resolve the dispute on their own, the system also permits the parties to resolve the dispute via arbitration or compliance with the help of an arbiter. The system provides the arbiter with access to the case folder to allow the arbiter to render an informed decision on the dispute.

20 Claims, 9 Drawing Sheets

U.S. PATENT DOCUMENTS

| | | |
|---|---|---|
| D249,900 S | 10/1978 | Lee |
| 4,299,073 A | 11/1981 | Golicz et al. |
| 4,408,203 A | 10/1983 | Campbell |
| 4,453,074 A | 6/1984 | Weinstein |
| 4,560,170 A | 12/1985 | Enyi |
| D298,536 S | 11/1988 | Brefka |
| 4,796,292 A | 1/1989 | Thomas |
| 4,797,920 A | 1/1989 | Stein |
| 4,835,690 A | 5/1989 | Gangarosa et al. |
| 4,868,900 A | 9/1989 | McGuire |
| 4,961,142 A | 10/1990 | Elliott et al. |
| 5,023,782 A | 6/1991 | Lutz et al. |
| 5,226,079 A | 7/1993 | Holloway |
| 5,412,192 A | 5/1995 | Hoss |
| 5,422,945 A | 6/1995 | Wyatt |
| 5,455,406 A | 10/1995 | Terashima et al. |
| 5,483,445 A | 1/1996 | Pickering |
| 5,544,246 A | 8/1996 | Mandelbaum et al. |
| 5,557,516 A | 9/1996 | Hogan |
| 5,586,036 A | 12/1996 | Pintsov |
| 5,632,011 A | 5/1997 | Landfield et al. |
| 5,649,118 A | 7/1997 | Carlisle et al. |
| 5,664,185 A | 9/1997 | Landfield et al. |
| 5,672,060 A | 9/1997 | Poor |
| 5,684,291 A | 11/1997 | Taskett |
| 5,684,965 A | 11/1997 | Pickering |
| 5,692,132 A | 11/1997 | Hogan |
| 5,699,528 A | 12/1997 | Hogan |
| 5,704,046 A | 12/1997 | Hogan |
| 5,705,798 A | 1/1998 | Tarbox |
| 5,732,400 A | 3/1998 | Mandler et al. |
| 5,734,820 A | 3/1998 | Howard et al. |
| 5,749,785 A | 5/1998 | Rossides |
| 5,758,126 A | 5/1998 | Daniels et al. |
| 5,771,343 A | 6/1998 | Hafner et al. |
| 5,794,206 A | 8/1998 | Wilkinson et al. |
| 5,819,263 A | 10/1998 | Bromley et al. |
| 5,826,247 A | 10/1998 | Pintsov et al. |
| 5,862,223 A | 1/1999 | Walker et al. |
| 5,863,073 A | 1/1999 | Taskett |
| 5,870,542 A | 2/1999 | Ander et al. |
| 5,870,725 A | 2/1999 | Bellinger et al. |
| 5,878,139 A | 3/1999 | Rosen |
| 5,878,215 A | 3/1999 | Kling et al. |
| 5,881,131 A | 3/1999 | Farris et al. |
| 5,893,076 A | 4/1999 | Hafner et al. |
| 5,895,450 A * | 4/1999 | Sloo ............................ 705/1 |
| 5,895,455 A | 4/1999 | Bellinger et al. |
| 5,923,734 A | 7/1999 | Taskett |
| 5,928,333 A | 7/1999 | Landfield et al. |
| 5,956,687 A | 9/1999 | Wamsley et al. |
| 5,970,143 A | 10/1999 | Schneier et al. |
| 5,970,479 A | 10/1999 | Shepherd |
| 5,983,205 A | 11/1999 | Brams et al. |
| 5,988,509 A | 11/1999 | Taskett |
| 5,991,733 A | 11/1999 | Aleia et al. |
| 5,991,748 A | 11/1999 | Taskett |
| 5,995,948 A * | 11/1999 | Whitford et al. ............. 705/41 |
| 6,023,705 A | 2/2000 | Bellinger et al. |
| 6,029,150 A | 2/2000 | Kravitz |
| 6,029,975 A | 2/2000 | Siemers |
| 6,035,041 A | 3/2000 | Frankel et al. |
| 6,038,292 A | 3/2000 | Thomas |
| 6,044,247 A | 3/2000 | Taskett et al. |
| 6,049,786 A | 4/2000 | Smorodinsky |
| 6,058,417 A | 5/2000 | Hess et al. |
| 6,061,792 A | 5/2000 | Simon |
| 6,067,532 A | 5/2000 | Gebb |
| 6,076,078 A | 6/2000 | Camp et al. |
| 6,086,397 A | 7/2000 | Chapman et al. |
| 6,101,477 A | 8/2000 | Hohle et al. |
| 6,115,458 A | 9/2000 | Taskett |
| 6,134,536 A | 10/2000 | Shepherd |
| 6,144,726 A | 11/2000 | Cross |
| 6,167,378 A | 12/2000 | Webber, Jr. |
| D436,620 S | 1/2001 | Webb et al. |
| 6,182,894 B1 | 2/2001 | Hackett et al. |
| 6,183,366 B1 | 2/2001 | Goldberg et al. |
| 6,192,034 B1 | 2/2001 | Hsieh et al. |
| D438,562 S | 3/2001 | Webb et al. |
| D438,563 S | 3/2001 | Webb et al. |
| 6,199,762 B1 | 3/2001 | Hohle |
| 6,208,978 B1 | 3/2001 | Walker et al. |
| D442,222 S | 5/2001 | Webb et al. |
| D442,627 S | 5/2001 | Webb et al. |
| D442,628 S | 5/2001 | Webb et al. |
| D442,629 S | 5/2001 | Webb et al. |
| 6,236,972 B1 | 5/2001 | Shkedy |
| D443,298 S | 6/2001 | Webb et al. |
| 6,259,700 B1 | 7/2001 | Hsieh et al. |
| 6,260,024 B1 * | 7/2001 | Shkedy ........................ 705/37 |
| D447,515 S | 9/2001 | Faenza, Jr. et al. |
| D449,336 S | 10/2001 | Webb et al. |
| 6,313,871 B1 | 11/2001 | Schubert |
| 6,315,193 B1 | 11/2001 | Hogan |
| 6,317,729 B1 * | 11/2001 | Camp et al. .................. 705/79 |
| 6,317,751 B1 | 11/2001 | Yeger et al. |
| 6,327,578 B1 | 12/2001 | Linchan |
| 6,330,551 B1 | 12/2001 | Burchetta et al. |
| 6,766,307 B1 * | 7/2004 | Israel et al. ................... 705/80 |
| 2001/0007106 A1 | 7/2001 | Slaikeu |
| 2001/0021915 A1 | 9/2001 | Cohen et al. |
| 2001/0027441 A1 | 10/2001 | Wankmueller |
| 2001/0032189 A1 | 10/2001 | Powell |
| 2001/0032878 A1 | 10/2001 | Tsiounis et al. |
| 2001/0034606 A1 | 10/2001 | Saidman et al. |
| 2001/0034648 A1 | 10/2001 | Caldwell |
| 2001/0034681 A1 | 10/2001 | Abbott et al. |
| 2001/0037204 A1 | 11/2001 | Horn et al. |
| 2001/0039524 A1 | 11/2001 | Harrison, Jr. et al. |
| 2001/0044729 A1 | 11/2001 | Pomerance |
| 2001/0044756 A1 | 11/2001 | Watkins et al. |
| 2001/0047329 A1 | 11/2001 | Ashby |

OTHER PUBLICATIONS

Derfler, Frank J. et. al. How Networks Work, Millennium Ed., Que Corporation, Jan. 2000.*

Gralla, Preston, How the Internet Works, Millennium Ed., Que Corporation, Aug. 1999.*

* cited by examiner

REQUEST FOR INFORMATION: REQUEST

User's can inquire on transactions through a variety of fields.

A set of response options are also provided

Request For Information

Transaction Data Range: 12/1/00  +/- 3 Days

Card Number: 4000001234567890
Transaction ID:
Acquirer's Reference Number:

At least one of these is required.

Transaction Amount:

☑ Financial Transaction
☑ Authorization Data
☑ Show All Case History
☐ Exception File Information ☐ Search For Credits From: 11/28/00

[Reset] [Print] [Send]

User: jclick
Name: James Click
Bank: Bank of America

*FIG. 4*

REQUEST FOR INFORMATION: RESPONSE

R.E.D. On-Line System - User: jclick - Microsoft Internet Explorer provided by Visa File  Edit  View  Favorites  Tools  Help Back  Forward  Stop  Refresh  Home  Search  Favorites  History  Mail  Print  Edit  Discuss  Messenger Address: http://www7203887rnta/ROLv2/red.asp User: jclick
Name: James Click
Bank: Bank of America ROL Home | RFI Search | My Queue | Search Case History | Custom Query | Log Out Date Range: 11/28/00 – 12/4/00  ← *User requested parameters are displayed*
Transaction Type: Financial, Authorizations, Case History,

RFI RESPONSE

Cardnumber: 4000012345678901
Credits: Not Selected.

| Tran Date | Tran Type | Tran Amount | MCC | Merchant | Location | MO/TO /ECI | POS Entry | Tran ID | DR | ACQ BIN |
|---|---|---|---|---|---|---|---|---|---|---|
| 12/4/00 | Auth | $165.45 | 7297 | Au Bon Pain | New York, NY | 7 | 6 | 98409847055647064 | True | |
| 12/1/00 | Orig | $156.45 | 7297 | British Petroleum | Durham, NC | 6 | 5 | 65476049870164461 | False | |
| 11/29/00 | Orig | $127.56 | 5411 | Harris Teeter | Durham, NC | 5 | 4 | 68406341380171421 | False | |

*List of transactions are displayed. Note originals & auths are given*

CASE HISTORY SUMMARY

| Case Number | Tran Date | Tran Amount | Case Status | Last Action Date | Merchant | Dispute Reason |
|---|---|---|---|---|---|---|
| 890798 | 2/12/00 | $123.56 | Chargeback | 10/4/00 | Jamba Juice | Services Not Rendered |
| 176974 | 6/27/00 | $127.59 | RFI Fulfillment | 9/28/00 | Safeway Foods | Late Posting |
| 304360 | 1/15/00 | $78.95 | Chargeback | 7/25/00 | TWA | Late Posting |
| 465465 | 1/16/00 | $56.34 | Chargeback | 4/15/00 | Jimbo's Boats | Amount Incorrect |

*Any Case History for this Card Number will be shown*

View Details | View Digital Receipt | Dispute | Print

View SubDraft | Search for Credits | Query Exception File

Done — Local intranet

FIG. 5

VIEW ORIGINAL TRANSACTION

Transaction Details: TranID 0192844887625654 - Microsoft Internet Explorer provided by Visa

View Original

Transaction Information:

- Card Number: 4000-0123-4567-8901
- Transaction Amount: 985.42
- Transaction ID: 0192844836492
- Purchase Date: 04/12/00
- Currency: US
- Mult. Clear.: __ of __
- Seq. Num:
- Processing Code: 05-Sales Draft
- Cashback/Other Amt:

[Discrepancy Report] [Digital Receipt] [Data Integrity Report] [Sub Draft] [Print] [Close]

Merchant Information:

- Merchant Category (MCC): 7531
- Card Acceptor ID: 671000126100008
- Name: Maaco Auto Painting
- City: Sarasota
- State/Province: FL
- Merchant Group: Other Merchants
- Acq. Business Ind.: 10029627
- Terminal ID: 11
- Tel. Num.: 925-736-3221
- Country: US
- Zip/Postal Code: 74101
- Format: 2
- Acq. BIN: 461043
- Acquirer Ref. Number:
- Acquirer Ref.: 0070
- Trace No. 7943118997
- Check: □

POS Information:

- Terminal Cap.: 2
- CAT: 0
- Entry Mode: 90
- PIN Entry Cap.: 1

Authorizaton Information:

- Authorization Response Code: 11
- Cardholder ID Method: 1
- AVS Response: Y
- Authorization Source Ind.: 5
- Floor Limit: A
- MO/TO/ECI: 1
- Authorization Amount: 985.42
- Total Authorization Amount: 985.42
- Authorization Code: 092685
- PCAS Ind.:
- CRB Ind.: N
- Special Condition Ind.:

Processing Settings:

- Reimbursement Attribute:
- Payment Service Ind.:
- C/B Rights:

---

Cardnumber: 4000-0123-4567-8901
Credits: From 4/12/00 To: 9/20/00

| MO/TO | POS Entry | Tran ID | DR | ACQ BIN |
|---|---|---|---|---|
| 1 | 02 | 0192844887625654 | x | 123478 |
| 1 | 02 | 0192844887625654 | | 123478 |
| 1 | 02 | 0192844563657789 | | 986155 |
| | 02 | 0192844836492 | x | 157954 |
| | 02 | 0192844836492 | | 157954 |

| Merchant Name | Dispute Reason |
|---|---|
| FAO Schwartz | Quality Issues |

[View Details] [InitiateDispute] [Print]

---

*Header portion has important transaction fields in a fixed frame.*

*Middle section has details of transaction, grouped logically.*

FIG. 6

Proposed US and Intl Sub Codes

Non-Receipt of Information

| Dispute Reason | New Reason Code | US | Intl' |
|---|---|---|---|
| Retrieval Request - Invalid Fulfillment | 1A | ✓ | ✓ |
| Cardholder Does Not Recognize Transaction | 1B | ✓ | ✓ |
| Retrieval Request - Non-Fulfillment | 1C | ✓ | |

Fraud

| Dispute Reason | New Reason Code | US | Intl' |
|---|---|---|---|
| Missing Signature and/or Imprint | 2A | ✓ | ✓ |
| Fraudulent Multiple Transactions | 2B | ✓ | ✓ |
| Counterfeit Card Used | 2C | ✓ | ✓ |
| Fraudulent Non Face-to-Face | 2D | ✓ | ✓ |
| Transaction Appeared on RIS Report | 2E | ✓ | ✓ |
| Fictitious Account Number / No Valid Card | 2F | | ✓ |

Authorization Errors

| Dispute Reason | New Reason Code | US | Intl' |
|---|---|---|---|
| No Authorization Obtained | 3A | ✓ | ✓ |
| Declined Authorization/ Referral (Referral is Intl only) | 3B | ✓ | ✓ |
| Expired Card | 3C | ✓ | ✓ |
| Exception File/Card Recovery Bulletin | 3D | | ✓ |
| Ineligible Transaction - Service Code | 3E | | ✓ |

Processing Errors

| Dispute Reason | New Reason Code | US | Intl' |
|---|---|---|---|
| Duplicate Processing | 4A | ✓ | ✓ |
| Incorrect Transaction Amount | 4B | ✓ | ✓ |
| Late Presentment | 4C | ✓ | ✓ |
| Paid By Other Means | 4D | ✓ | ✓ |
| Transaction Exceeds Limited Amount Terminal | 4E | ✓ | ✓ |
| Incorrect Account Number (Intl includes non-matching) | 4F | ✓ | ✓ |
| Incorrect Transaction Code/Non Transaction Currency (Intl only) | 4G | ✓ | ✓ |
| Transaction Deposit Violation | 4H | | ✓ |
| *Non-Matching Account Number | 4I | ✓ | |

*Intl placed Non Matching account # with Incorrect Account Number, 4F

*FIG. 7*

Cancelled/Returned

| Dispute Reason | New Reason Code | US | Intl' |
|---|---|---|---|
| Credit Transaction Receipt Not Processed | 5A | ✓ | ✓ |
| Cancelled Recurring Transaction | 5B | ✓ | ✓ |
| Cancelled Time Share Transaction | 5C |  | ✓ |
| Cancelled Guaranteed Reservation | 5D |  | ✓ |
| Cancelled Advance Deposit | 5E |  | ✓ |
| Cancelled/Returned Good or Services | 5F | ✓ | ✓ |
| Merchandise Defective | 5G |  | ✓ |
| Merchandise or Cancelled Services Not as Described | 5H |  | ✓ |

Non-Receipt of Information

| Dispute Reason | New Reason Code | US | Intl' |
|---|---|---|---|
| Non Receipt of Services | 6A | ✓ | ✓ |
| Non Receipt of Merchandise | 6B | ✓ | ✓ |
| Non Receipt of ATM Cash (includes partial) | 6C |  | ✓ |

Fraud

| Dispute Reason | New Reason Code | US | Intl' |
|---|---|---|---|
| Goods/Services Not as Described or Unsuitable | 7A | ✓ |  |
| Goods Received but Damaged/Defective | 7B | ✓ |  |

*FIG. 7* (CONTINUED)

METHOD AND SYSTEM FOR FACILITATING ELECTRONIC DISPUTE RESOLUTION

BACKGROUND OF THE INVENTION

Created more than twenty-five (25) years ago, the credit card dispute process has seen many changes leading to a more complex system that is difficult to learn. Today, it typically takes a chargeback analyst twelve (12) months to become proficient in a job that statistics show they will leave generally within eighteen (18) months. In many companies, being a chargeback analyst is an entry-level position which requires an extensive knowledge in a number of areas including, for example, forty-four (44) U.S. chargeback reason codes, forty (40) international chargeback reason codes, differences between T&E and non-T&E disputes, differences between card present and card-not-present disputes and possible pre-compliance situations.

While new fraud monitoring programs, alert systems, system edits, and changes to operating regulations have resulted in substantial reductions in chargebacks over the past decade, no comparable effort has been invested in the clerical and procedural aspects of dispute processing.

The current credit card dispute process is quite antiquated and fraught with a number of major issues. For example, the current dispute process is a paper and labor intensive process. Physical evidence is usually required today to initiate a dispute. Evidence may take the form of a copy of the sales draft or a cardholder's signature on a dispute letter even though a signature provides limited value in the majority of disputes that are not fraud related. Furthermore, all parties may be required to provide written documentation at any point throughout the dispute process. Reliance on paper and postal delivery results in a slower process in resolving disputes as there has to be extended time frames to deliver and receive documentation, and the possibility always exists that the documentation could be lost in transit. Hence, retrieval and distribution of draft copies and obtaining cardholder letters is time-consuming, costly and labor intensive.

The collection of facts pertinent to a particular dispute is also difficult. Cardholders are generally required to provide signed letters before disputes can be initiated. Cardholder dispute letters often contain many facts that are not relevant; or conversely, these letters may be missing information needed for a particular dispute. Furthermore, many issuers use their own form letters. These letters cause difficulties for merchants by providing inconsistent information in different formats. Acquirers and processors also use different proprietary letters to communicate with issuers.

The paper and labor intensive process often translates into customer dissatisfaction. Cardholders and merchants generally do not like to supply written documentation. They often view requirements for written documentation as poor customer service. In addition, most cardholders and merchants do not understand the dispute process, documentation needed to support the process, and why they may be contacted multiple times for additional documentation.

The current credit card dispute process is also time consuming for all of the parties involved. The more complex cases may take over 300 days to reach resolution, putting issuers well beyond any federally regulated time frames in which they must resolve dispute claims. Cardholders and merchants are frustrated when they have to wait a lengthy amount of time for resolution, and customer service analysts are not meeting the level of service expectations set by their customers.

The current dispute process is also generally viewed as being difficult to follow and use. For instance, chargeback rules differ by market segment—e.g. retail, mail order/telephone order and T&E—and between U.S. and international rules. At the present time, the U.S. region has forty-four (44) domestic chargeback reason codes and the international rules have an additional forty (40) chargeback reason codes. Some of these reason codes are ambiguous, while others overlap. Issuers' ability to choose a chargeback right depends on a combination of these factors. An extensive training period from six months to a year is required for employees to become proficient at working with the chargeback process. Furthermore, the current process can be litigious, requiring affidavits, arbitration and litigation.

Chargeback processing also continues to be paper-oriented, manually intensive, complex, mail-dependent and lengthy. It is estimated that hundreds of millions of dollars are spent every year to resolve credit card disputes and handle chargeback processing. Additional millions are incurred in connection with merchant expenses and write-offs for failure to meet regulatory requirements. Several factors contribute to the high cost of the current dispute process including, for example, failure to process disputes within regulatory timeframes are costly, member write-offs due to failure to meet regulatory requirements, member write-offs due to high cost of processing, member write-offs due to chargeback minimums, merchant expenses, the costly, lengthy training process for dispute analysts compounded by frequent staff turnover, and variances among different chargeback rules increasing the liability exposure for issuers and acquirers.

Hence, it would be desirable to provide a method and system that is capable of facilitating credit card dispute resolution in a more efficient and cost-effective manner.

SUMMARY OF THE INVENTION

A system for facilitating payment transaction disputes is provided. According to one exemplary aspect of the system, different users, such as, a cardholder, a merchant, an issuer and an acquirer, are allowed to use the system to resolve a disputed transaction. Typically, a disputed transaction is first reported by a cardholder to an issuer. Based on information provided by the cardholder, the issuer is able to use the system to retrieve transactional information relating to the disputed transaction reported by the cardholder for review. When the issuer uses the system to retrieve information relating to the disputed transaction, a case folder is created. The case folder is a repository for storing all the relevant information and documentation relating to the disputed transaction. Using the information retrieved by the system, the issuer then determines whether to initiate a dispute. Alternatively, the system can also be used by an acquirer to initiate a dispute, on behalf of one of its merchant. If a dispute is initiated, a questionnaire is then created by the system. Alternatively, the issuer or acquirer may decline to initiate a dispute and either seek additional information from the customer or deny the customer's inquiry.

The case folder and the questionnaire are created for a specific disputed transaction. The questionnaire is designed to capture information from the cardholder and/or the issuer relating to the disputed transaction. The questionnaire may be pre-populated with previously retrieved transactional information which is now stored in the case folder. Relevant documents in support of the disputed transaction may also be attached as part of the questionnaire. Various parties to the dispute may then provide relevant information (including supporting documentation) to the system. The relevant information provided by the parties is maintained in the case folder.

The system then keeps track of the relevant timeframes for the case folder to ensure that each party to the dispute is given the correct period of time to respond during the processing of a dispute. An alert may be generated to alert each party with regard to actions, wherein the action can be output to a computing device. If resolution is not reached during the initial phase of the dispute, the system permits the parties to further attempt to resolve the dispute amongst themselves without the help of an arbiter through pre-arbitration and pre-compliance. If the parties to the dispute are unable to resolve the dispute on their own, the system also permits the parties to resolve the dispute via arbitration or compliance with the help of an arbiter. An arbiter may include a credit card association, such as, Visa. The system provides the arbiter with access to the case folder to allow the arbiter to render an informed decision on the dispute. If the system is not available to one of the parties to the dispute, the system is able to generate a file to print the necessary documentation which is then mailed to this party.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 4 is an illustrative diagram showing an exemplary embodiment of an input screen designed to capture information for a RFI in accordance with the present invention;

FIG. 5 is an illustrative diagram showing an exemplary embodiment of a screen displaying portions of a RFI response in accordance with the present invention;

FIG. 6 is an illustrative diagram showing an exemplary individual transaction within the RFI response in accordance with the present invention;

FIG. 7 is a table listing the various dispute groups and their underlying reason codes in accordance with the present invention.

DETAILED DESCRIPTION OF THE INVENTION

Figure 1:
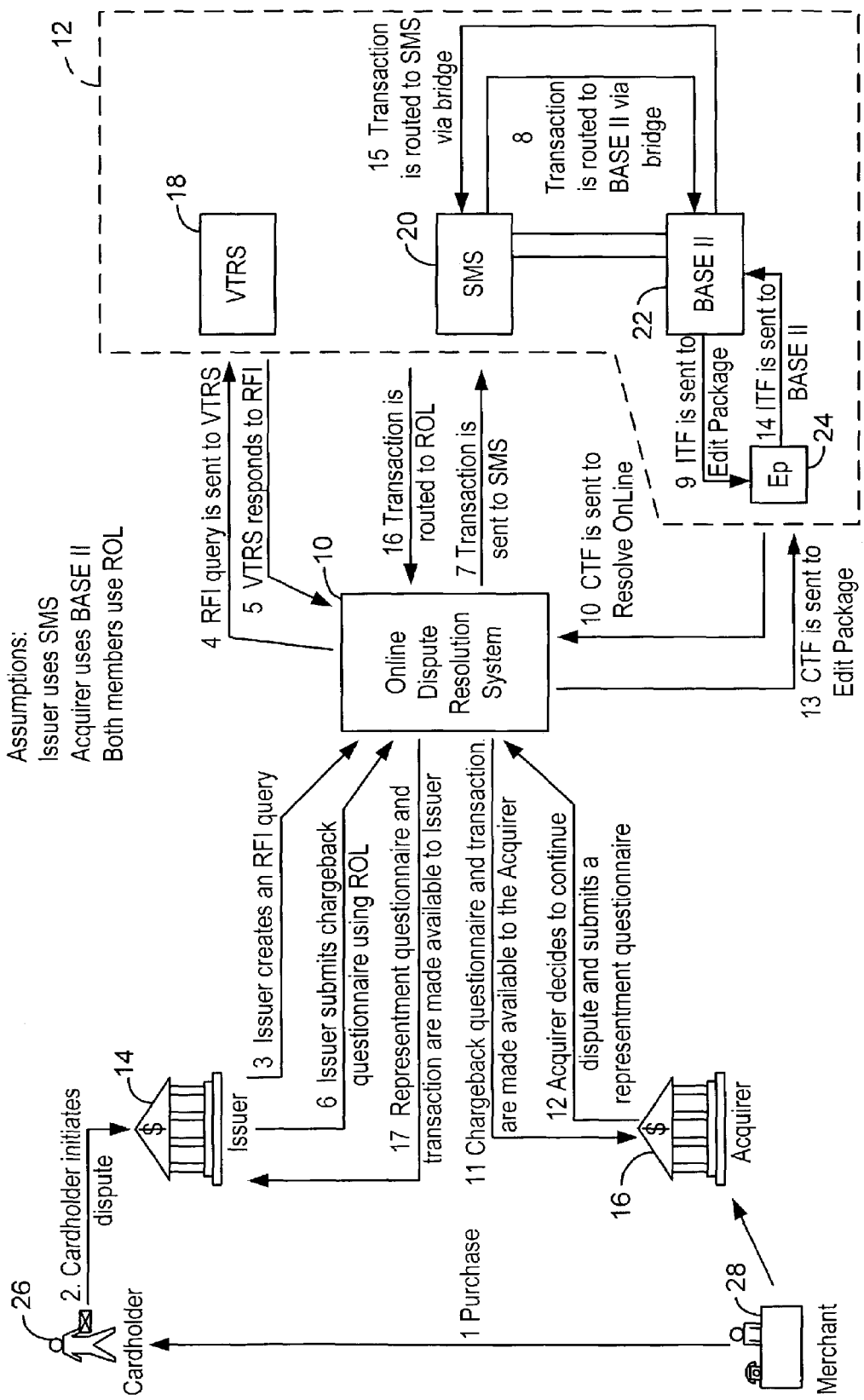
FIG. 1 is a simplified schematic diagram illustrating how an exemplary embodiment of the present invention is used in connection with other systems to resolve credit card dispute.

The present invention in the form of one or more exemplary embodiments will now be described. FIG. 1 is a simplified schematic diagram illustrating how an exemplary embodiment of the present invention is used in connection with other systems to resolve credit card dispute. Referring to FIG. 1, in this exemplary configuration, an online dispute resolution system 10 of the present invention interacts with a number of other systems including one or more user systems and a back-end system 12. The user system permits a user or service subscriber to access the online dispute resolution system 10 and use various types of services offered by the online dispute resolution system 10 to resolve a credit card dispute. Typically, users include issuers and acquirers. The user systems include, for example, an issuer system 14 and an acquirer system 16.

Optionally, users may include cardholders 26 and merchants 28. In an alternative exemplary embodiment, users such as cardholders 26 and merchants 28 are allowed access to the online dispute resolution system 10 to report disputed transactions and monitor their progress. Cardholders 26 and merchants 28 may be given access to the online dispute resolution system 10 via either their respective issuer and acquirer systems 14 and 16 or a secure website provided by the online dispute resolution system 10. Access given to cardholders 26 and merchants 28 may be restricted.

The back-end system 12 provides access to requisite transactional information to allow the online dispute resolution system 10 to resolve a credit card dispute between an issuer and an acquirer. The back-end system 12 may include, for example, a VTRS system 18, a SMS (single message system) 20, a BASE II system 22 and an edit packaging system 24.

As will be further described below, the online dispute resolution system 10 provides a number of services which facilitate service subscribers or users to resolve credit card disputes amongst themselves. For illustrative purposes herein, these service subscribers or users are generally referred to as issuers and acquirers. However, it should be understood that service subscribers or users may include any parties or entities that are involved in a credit card transaction.

The online dispute resolution system 10 processes a credit card dispute in the following exemplary manner. The dispute generally goes through a number of life cycle stages. Typically, a dispute begins when a cardholder 26 initiates a dispute action. A dispute action may include, for example, an inquiry about the legitimacy of a transaction which appears on the cardholder's billing statement. The dispute action is generally directed to the issuer which issues the cardholder's account. It should be noted that reporting of the dispute can be done in a number of ways. For example, a cardholder 26 may contact his/her issuer to report a dispute via telephone, written correspondence, or electronic communications, such as, email. The issuer, in turn, communicates with the online dispute resolution system 10 via its own system. Alternatively, a cardholder 26 may use a service provided by the online dispute resolution system 10 to report a disputed transaction. When the disputed transaction is reported in this manner, the online dispute resolution system 10 communicates with the relevant issuer and informs the issuer that a disputed transaction has been reported by one of its cardholders.

Request for Information Stage

Figure 2:
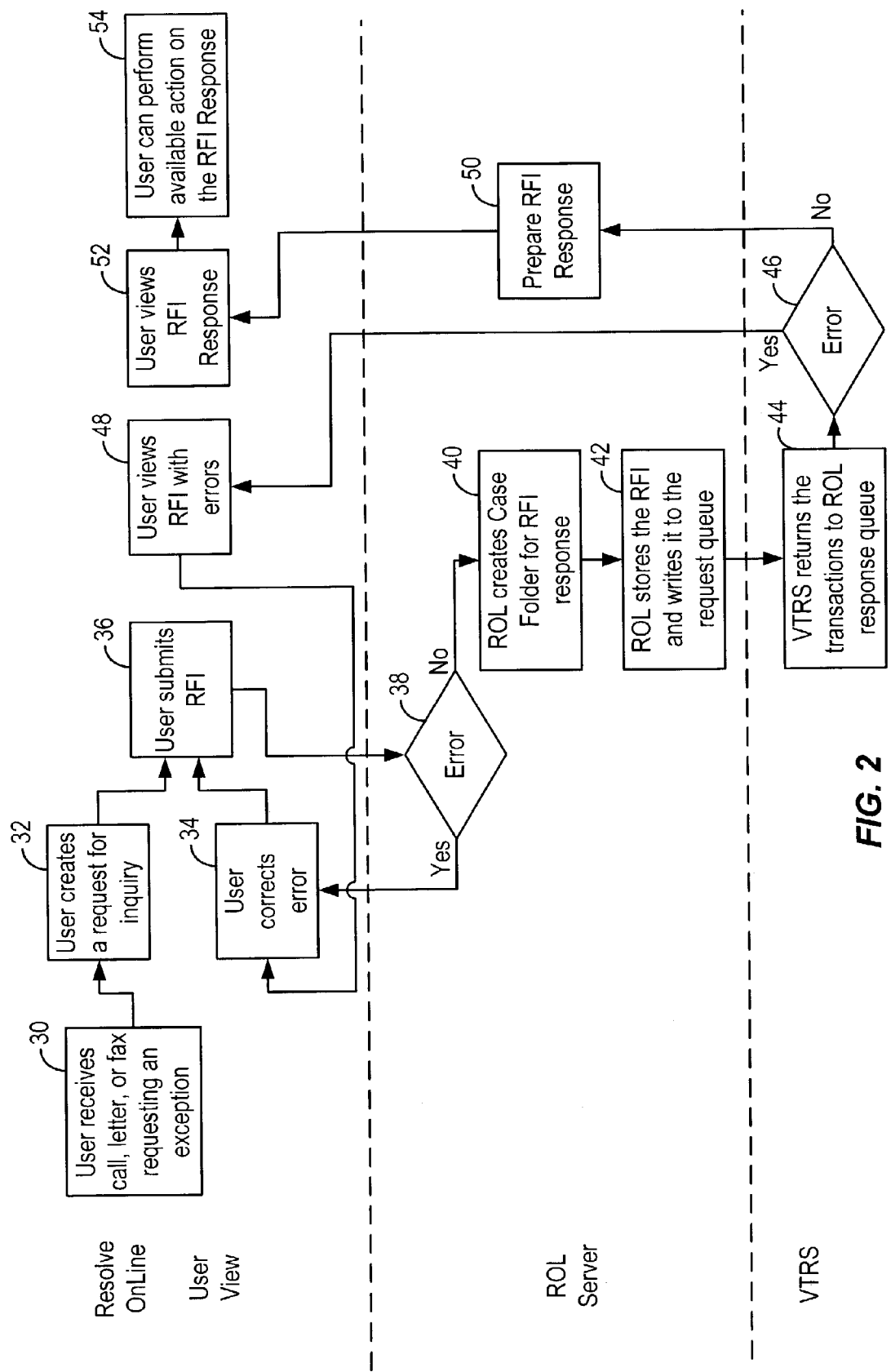
FIG. 2 is a flow diagram illustrating an exemplary process flow during the request for information stage in accordance with an exemplary embodiment of the present invention.

When the issuer receives report of a disputed transaction, the dispute enters into a request for information (RFI) stage. The RFI stage allows the service subscribers, such as, the issuer and the acquirer, who are involved to research the disputed transaction and respond to customer's inquiries. FIG. 2 is a flow diagram illustrating the exemplary process flow during the RFI stage. Referring to FIG. 2, interactions between three entities during the RFI stage are illustrated.

The three entities are the user, the online dispute resolution system 10 and the VTRS system 18 which contains the transaction records.

At 30, the user (in this case, an issuer) receives an inquiry from a cardholder questioning the legitimacy of a particular transaction. At 32, the issuer uses information provided by the cardholder to create a RFI. The RFI includes appropriate search parameters, such as, card number, date range, transaction ID and/or transaction amount, to allow the relevant transaction(s) to be retrieved. The issuer may also request a transaction by entering one or more of the following search parameters including, for example, transit and routing number, account number and check number for point-of-sale (POS) checks. Furthermore, the issuer may specify the type of transaction requested, such as, authorization, original transaction, credit, exception file and case history summary (i.e., view of all case folders for the same card number). The concept of case folders will be further described below. FIG. 4 is an illustrative diagram showing an input screen designed to capture information for a RFI.

At 36, the issuer submits the RFI to the online dispute resolution system 10. The online dispute resolution system 10 then interacts with the back-end system 12 to retrieve the relevant transaction(s). For example, the VTRS system 18 is accessed to return information on the relevant transaction(s).

The online dispute resolution system 10 is able to search on an account number, transaction ID, date range and transaction amount. This flexibility accommodates differences in system dates and any possible fees included in the amount. The online dispute resolution system 10 can also retrieve sales transactions and any associated credits, reversals and adjustments. The search can further be limited by inputting a dollar amount for sales transactions.

At 38, the search parameters are checked by the online dispute resolution system 10 for errors. If there is an error, at 34, the issuer is prompted to provide the correct parameters to the online dispute resolution system 10. The corrected RFI is then submitted to the online dispute resolution system 10 again. At 40, if there is no error, the online dispute resolution system 10 creates a case folder for a RFI response. The case folder contains the consolidated history of all information and documents related to a single, original disputed transaction. Case folders for related transactions can be linked and worked on as a group. Case folders may be grouped together for a number of reasons, such as, if the dispute is for the same parties, dispute group and/or reason. When a merchant has processed a single purchase as multiple transactions, these multiple transactions can be disputed as a group. Within the group, each transaction is for the same card account number but may be for different merchant names and locations. Conversely, the online dispute resolution system 10 allows response questionnaires relating to a single merchant to be grouped together. The grouped response questionnaires may correspond to transactions having different card numbers.

At 42, the online dispute resolution system 10 stores the RFI and writes it to a request queue. Items in the request queue then await processing by the VTRS system 18. The online dispute resolution system 10 allows the issuer to view the RFIs that have queued for processing and their respective statuses. Different types of status include, for example, (1) pending—awaiting response, (2) error—search criteria errors or no transactions found, and (3) fulfilled—RFI response received but dispute not initiated.

At 44, the RFI from the request queue is processed by the VTRS system 18 and the relevant transaction(s) is then retrieved from the appropriate databases. More than one relevant transaction matching the search criteria may be returned. Also, when no relevant transaction is found, the online dispute resolution system 10 generates a message indicating that no relevant transaction can be found and information is added to the corresponding case folder to indicate that a transaction search had taken place. Typically, the relevant transaction is stored in a response queue for delivery to the online dispute resolution system 10. At 46, the relevant transaction is checked for errors. For example, if an acquirer is performing the RFI, the online dispute resolution system 10 is able to check for bank ID number after the relevant information has been pulled. If there is an error associated the relevant transaction, then the erroneous transaction and the RFI are returned by the VTRS system 18 via the online dispute resolution system 10 to the user for review at 48. The user then supplies the correct parameters and re-submits the corrected RFI. If there is no error, then at 50 the online dispute resolution system 10 processes and incorporates the retrieved transaction with any additional information into the RFI response.

The RFI response includes one or more of the following types of information for each searched transaction: transaction date, transaction type, transaction amount, MCC code and MCC description, merchant name, merchant location, EC/MOTO indicator, POS entry mode code, transaction ID, POS entry capability and multiple clearing sequence number (if applicable). The online dispute resolution system 10 is also able to provide as part of the RFI response additional information, if applicable, including but not limited to: full, partial magnetic stripe read key entered, authorized/declined/pickup/referral response, issuer, processor or Visa stand-in processing, address verification service (AVS) use, card verification value 2 (CVV2) use, PIN verification service (PVS) use, and data integrity problem (DIP) reported. Depending on the specific type of transaction in question, the online dispute resolution system 10 may further return other additional information as part of the RFI response. The RFI response is then forwarded to the issuer for review at 52. FIG. 5 is an illustrative diagram showing a screen displaying portions of the RFI response. Details relating to individual transactions within the RFI response can be further displayed by the online dispute resolution system 10. FIG. 6 is an illustrative diagram showing an individual transaction within the RFI response.

Optionally, when returning transactions as part of the RFI response, the online dispute resolution system 10 may highlight transactions that are tied to authorization-related chargebacks that are (1) below floor limit and was listed on the exception file; (2) in excess of the floor limit and authorizations were not obtained; and (3) related to a present referral. Other transactions may also be highlighted if such transactions are tied to all chargeback types that (1) were previously or, are currently being disputed; and (2) relate to a credit which was previously given when there was or was not a corresponding transaction.

For POS check transactions returned as part of the RFI response, the online dispute resolution system 10 may also provide the following information: check number, transit routing number, transit time, POS condition code, and check settlement code.

At 54, the issuer takes appropriate actions based on the RFI response. The issuer may perform a number of different actions. For example, the issuer may search for additional, related credit transactions. The issuer may further view transaction details relating to the original transaction as well as the additional, related transactions and query any exception file related thereto. The transactions may be viewed in the form of substitute drafts, digital receipts and case history summaries. Upon reviewing the transactions, the issuer may then initiate one or more of the following actions including (a) request for copy, (b) attempt to resolve, (c) chargeback, (d) pre-compliance and (e) good faith collection. Optionally, RFI responses are deleted at a system-wide level if no action is taken after a set number of days.

The online dispute resolution system 10 further allows the user to include one or more of the returned transactions in the case folder and add to the case folder comments pertaining to review of the returned transactions. Alternatively, the online dispute resolution system 10 may automatically include all the returned transaction(s) in the case folder. In addition, the online dispute resolution system 10 may allow the user to simultaneously view more than one case folder.

Attempt to Resolve (ATR)

Attempt to resolve is a conditional stage where one party initiates an ATR through the online dispute resolution system 10 or through some other means of communication (i.e., telephone call) to the other party, so that they may mutually agree on a resolution with respect to a disputed transaction. An ATR is designed to be initiated prior to initiation of a dispute by a user. When an ATR is initiated, certain information is requested and captured by the online dispute resolution system 10 from the initiating party. The initiating party is typically either an issuer or an acquirer. If the ATR is initiated through the online dispute resolution system 10, the online dispute resolution system 10 accordingly informs the intended recipient of the ATR.

For some dispute groups, an ATR is ascertained before an issuer is able to generate a chargeback. Illustrative dispute groups include (1) non-receipt of information, (2) authorization errors, (3) processing errors, (4) non-receipt of goods or services, (5) canceled/returned, (6) quality, and (7) fraud. For some of these dispute groups, such as, (4) non-receipt of goods or services and (6) quality, an ATR may be required, while others, such as, (1) non-receipt of information and (2) authorization errors, an ATR may not be required; and yet for some others, such as, (3) processing errors, (5) canceled/returned and (7) fraud, an ATR may be optional. In other words, before the user may initiate a dispute, the online dispute resolution system 10 checks the disputed transaction to ascertain its dispute group and accordingly determines whether an ATR is needed. If an ATR is needed, the online dispute resolution system 10 prompts the user to initiate the ATR. Optionally, the online dispute resolution system 10 may provide a facility, such as an email directory and delivery service, to allow the user to initiate the ATR with the appropriate party.

If an ATR is initiated through the online dispute resolution system 10, after the recipient receives the ATR from the initiating party, the recipient is given a timeframe to respond. The online dispute resolution system 10 monitors this timeframe accordingly. The length of the timeframe to respond may be specified by the initiating party or, alternatively, may be set by the online dispute resolution system 10.

Upon receiving the ATR from the initiating party, the recipient may either accept or decline the ATR by filling out a response questionnaire and/or attaching any supporting documents. The response questionnaire and any supporting documents are captured and filed with the associated case folder by the online dispute resolution system 10. The case folder including the response questionnaire is then available for review by the initiating party.

Initiation of Dispute

Upon reviewing the RFI response, the user may decide to initiate a dispute with respect to the disputed transaction using the online dispute resolution system 10. If the user initiating the dispute is an issuer, then the dispute initiation results in a chargeback. Once a dispute is initiated, the online dispute resolution system 10 creates a questionnaire that is to be completed by the user and/or its customer. Information related to the disputed transaction is captured using the questionnaire. The questionnaire can be completed in a number of ways. For example, an issuer customer service representative using an interface to the online dispute resolution system 10 may fill in the questionnaire on behalf of the cardholder. Alternatively, an issuer may provide their cardholders an interface to allow the cardholders to provide the requested information for the questionnaire. This interface may be provided through the issuer's own proprietary web site or some other secure web site. The information captured from the interface is then passed by the issuer to the online dispute resolution system 10. Furthermore, whenever appropriate, the questionnaire may be automatically populated from information already contained in the case folder, if an RFI was performed previously. As mentioned above, except for manual questionnaire, each case folder corresponds to a specific disputed transaction and contains the RFI response.

The questionnaire is designed to guide a user (that is the person completing the questionnaire) intuitively through collection of the required information for different dispute groups and their associated sub codes. Information input into the questionnaire generates subsequent questions to gather additional, relevant data from the user. The user may be any one of the parties involved in the dispute including a cardholder, a merchant, an issuer and an acquirer, although rights to use the online dispute resolution system 10 vary depending on the identity of the user. For example, in one exemplary embodiment, only issuers and acquirers are permitted to submit information directly to the online dispute resolution system 10; cardholders and merchants are merely allowed to pass information to their respective issuers and acquirers.

The questionnaire is designed to solicit various types of information to capture all perspectives of the dispute. Different types of information include, for example, information concerning why the cardholder has reported a dispute, the merchant's response to what the cardholder has stated, as well as any information which both the issuer and the acquirer may provide.

The dispute date is deemed to be the date the questionnaire was submitted to the online dispute resolution system 10. Additions to the original questionnaire may be time stamped and added to the case folder to create a case history. Preferably, all questionnaire information is added and does not replace previously submitted information or documents in order to provide a proper audit trail. The online dispute resolution system 10 further provides that a message be displayed and acknowledged with the questionnaire, certifying that the user confirms the accuracy of information in the questionnaire. The questionnaire also provides a message text field to give the user the capability to provide any additional comments regarding the dispute.

If the user is an issuer, the issuer may optionally enter the following cardholder contact information, including cardholder name, cardholder phone number, cardholder fax number, cardholder email address, cardholder address and most convenient time to contact. For security and privacy reasons, the user will be prompted to obtain permission from the cardholder for release of personal contact information to the merchant.

Likewise, if the user is an acquirer, the acquirer may optionally enter the following merchant contact information, including merchant contact name, merchant contact phone number, merchant contact email address, merchant contact fax number, merchant web page (URL) address and most convenient time to contact. The user will be prompted to obtain permission from the merchant for release of personal contact information to the cardholder.

Depending on the dispute group identified in connection with the disputed transaction, the issuer may be asked in the questionnaire to state whether the cardholder has been asked if s/he has made an ATR to resolve the dispute directly with the merchant. If the issuer responds that the cardholder did attempt to resolve the dispute, the following fields are displayed for the issuer to enter certain information including, for example, date of last contact, name of person cardholder spoke to, phone number or e-mail address cardholder called/wrote to, description of ATR outcome, summary of ATR with the merchant.

If the cardholder did not attempt to resolve the dispute, then the online dispute resolution system 10 according informs the issuer that the cardholder should be prompted to make the ATR prior to proceeding. Alternatively, the online dispute resolution system 10 may allow the issuer to add a text message stating why cardholder did not attempt to resolve the dispute with the merchant (e.g. inbound telemarketing transaction, cardholder does not have phone number, merchant is no longer in business).

If the cardholder agrees to resolve the dispute with the merchant, the online dispute resolution system 10 then allows the issuer to complete the questionnaire and mark the corresponding case folder as "pending" until the cardholder comes back with the results of the ATR.

As mentioned above, the online dispute resolution system 10 may be used by a user to initiate an ATR. If an ATR is initiated through the online dispute resolution system 10, after the recipient receives the ATR from the initiating party, the recipient is given a timeframe to respond. The online dispute resolution system 10 monitors this timeframe accordingly. The length of the timeframe to respond may be specified by the initiating party or, alternatively, may be set by the online dispute resolution system 10.

Optionally, the issuer may generate a manual questionnaire by entering specific transaction details which can include the following: card account number/checking account number for POS check transactions, transaction date, transaction amount, transaction ID, acquirer reference number, transit routing number (ABA) (for POS check transactions).

Furthermore, the user may attach one or more supporting documents with the questionnaire. A list of recommended documents for each dispute group is displayed in the questionnaire. Some of the documents that may be helpful in resolving the dispute include, for example, transaction receipt (sales draft), credit receipt, refund acknowledgment, cardholder letter, merchant letter, 3rd-party opinion, merchant's goods/service description, merchant's return/cancellation instructions, proof of delivery, shipment letter, transaction log (ATM), issuer certification, acquirer certification, Visa certification, authorization logs and other certificates. The user is prompted to specify a document type with a text description for each attached document.

Documents may be attached to the questionnaire in a number of ways. For example, a list of available documents may have already been included in the online dispute resolution system 10. A user may then simply select from the list of available documents and attach the desired documents to the questionnaire. Alternatively, if a document is not available via the online dispute resolution system 10, the online dispute resolution system 10 provides a facility to allow a user to electronically attach a document to the questionnaire from an external source by, for example, browsing the network or shared drives.

The questionnaire and any supporting documents are then incorporated into the case folder which is specific to a single disputed transaction. In an exemplary embodiment, all the parties involved in the dispute, namely, the issuer, the acquirer, the cardholder, the merchant and the credit card association such as Visa, are respectively given access to information within the case folder, the level of access depending on the identity of the user. The involved parties are given access to their own information unless they specifically grant permission to another party to view their information. The online dispute resolution system 10 also determines if a user is able to receive the information online or by mail. If a user is only able to receive the information by mail, the online dispute resolution system 10 will accordingly identify the case folder to permit the relevant information to be printed for mailing.

The online dispute resolution system 10 manages the dispute process to ensure that all the dispute life cycle stages are executed in the correct order within the allowable timeframes. In particular, the online dispute resolution system 10 periodically reviews the case folder during each dispute life cycle stage to make sure that the appropriate actions or measures are taken. When all rights have expired, the online dispute resolution system 10 closes the case folder and retains the case folder for a predetermined number of months before archiving or purging the case folder offline.

Chargebacks and Representments

If a resolution cannot be attained in the RFI or ATR stages, the information gathered can be used to initiate a dispute with respect to the disputed transaction through the online dispute resolution system 10. The online dispute resolution system 10 provides users with a simplified process for creating chargeback and representment transactions as well as a way of providing information and/or supporting documentation. The simplification is based on seven new dispute groups and the ability of the online dispute resolution system 10 to intuitively guide the user through the underlying reason codes for each group.

FIG. 7 is a table listing the various dispute groups and their underlying reason codes. The new dispute groups include (1) non-receipt of information, (2) authorization error, (3) processing error, (4) non-receipt of goods or services, (5) canceled/returned, (6) quality, and (7) fraud.

Before a chargeback transaction can be created, an issuer may use the online dispute resolution system 10 to perform a search for related credit transactions in the RFI stage as described above. The issuer verifies, via the RFI response, whether or not related credit transactions have been posted to the cardholder's account. Additionally, to prevent duplicate chargeback, the online dispute resolution system 10 also highlights a transaction if there is already a dispute associated with it. If the cardholder states that credit was given but not posted, the questionnaire displays the following fields for data entry including voucher date, invoice/receipt number, indication of whether or not a credit voucher, letter of intent to credit, or refund acknowledgment was given to the cardholder. For merchants or acquirers, the online dispute resolution system 10 allows them to state whether a credit was given. If the merchant or acquirer states that credit was given, the questionnaire displays the following fields for data entry including date credit processed, ARN, credit amount, and indication of whether or not a credit voucher, letter of intent to credit, or refund acknowledgment was given to the cardholder.

Users are able to use the online dispute resolution system 10 to create a chargeback transaction from a combination of cardholder questionnaire data and the original transaction retrieved during the RFI stage.

To initiate a chargeback transaction, the user is prompted by the online dispute resolution system 10 to select one of the seven dispute groups noted above. In addition, the user is also prompted to select a dispute reason from a list of reason codes shown for the selected dispute group. Different reason codes may be associated with different dispute groups. If the original transaction is old enough such that it is no longer available to the online dispute resolution system 10, a manual chargeback may be initiated.

For a dispute group of "non-receipt of information", a request for copy may need to be in the corresponding case folder and the acquirer must have fulfilled the request, responded with a non-fulfillment message or the fulfillment timeframe must have expired. The dispute reason for non-receipt of information can be one of the following: "retrieval request—non-fulfillment", "retrieval request—invalid fulfillment" and "cardholder does not recognize transaction". Additional information may also be optionally entered including issuer reference number and other additional information.

When the dispute reason of "invalid fulfillment" is given, additional information is given to show why the fulfillment is invalid. This can include "inappropriately supplied substitute draft receipt", "batch header", "illegible transaction information", and "other—a description must be provided for this reason".

Acquirers may represent the non-receipt of information chargeback when permitted and provide the following information including acquirer case number, fulfillment method (online or by mail), and other additional Information.

The dispute reason for authorization errors can be one of the following: "no authorization obtained", "declined authorization/referral", "expired card", "exception file/card recovery bulletin" and "ineligible transaction-service code".

The dispute reason for processing error can be one of the following: "duplicate processing", and "incorrect transaction amount", "late presentment", "paid by other means", "transaction exceeds limited amount terminal", "incorrect account number", "incorrect transaction code/non transaction currency", "transaction deposit violation" and "non-matching account number".

When a dispute reason of "paid by other means" is provided, the online dispute resolution system 10 asks the cardholder or issuer to specify what other means of payment was used based on the following options: cash, online debit, check, other credit card (other account number may be entered), and other (specify what other means). When this particular dispute reason is given, the online dispute resolution system 10 further requests the issuer or cardholder to provide proof of payment by other means. The type of proof of payment to be provided is based on the other means of payment specified in the questionnaire including, for example, copy of check (front and back), copy of credit card receipt/statement, copy of online debit receipt/statement, copy of cash receipt, and other. Merchant may address the cardholder's information that supports the alternate means of payment.

When generating a processing error chargeback, the online dispute resolution system 10 also prompts the user to supply certain supporting information. For example, the online dispute resolution system 10 may prompt the cardholder or issuer to indicate the date the credit or refund was issued and if a receipt was provided. The online dispute resolution system 10 may suggest to the cardholder or issuer to include the following document types to substantiate the chargeback including, for example, cardholder's transaction receipt or other record showing an error, discrepancy, or altered amount and credit transaction receipt (the user will be notified that a lost ticket or refund application is not considered a credit). Furthermore, the online dispute resolution system 10 may also suggest to the merchant or acquirer to include the following document types to facilitate calculation of the chargeback including, for example, agreement demonstrating that the cardholder has consented to be liable for delayed or amended charges for a T&E transaction.

The dispute reason for the "non-receipt of goods or services" dispute group can be one of the following: "non-receipt of services", "non-receipt of merchandise" and "non-receipt of ATM cash".

When a dispute reason code of "non-receipt of merchandise" or "non-receipt of services" is provided, the cardholder or issuer is prompted to provide the expected date of receipt of the goods or services.

When a dispute reason of "non-receipt of services" is provided, the online dispute resolution system 10 questions the acquirer/merchant to determine if the service was provided. If it was, the following information is entered including: service date and description of the services provided.

When a dispute reason of "non-receipt of merchandise" is provided, the online dispute resolution system 10 confirms with the merchant/acquirer to determine if the merchandise was shipped. If the merchandise was shipped, the relevant shipping information is gathered from the merchant/acquirer.

The dispute reason for the "cancelled/returned" dispute group can be one of the following including, for example, "credit transaction receipt not processed", "cancelled recurring transaction", "cancelled time share transaction", "cancelled guaranteed reservation", "cancelled advance deposit", "returned goods", "merchandise defective" and "merchandise or cancelled services not as described". When this dispute group is selected, the issuer is prompted by the online dispute resolution system 10 to provide certain information, such as, cancellation date, cancellation number (if applicable), and cancellation reason.

In addition, the online dispute resolution system 10 allows the acquirer/merchant to specify whether or not the cardholder had been given the merchant's cancellation policy either in writing or verbally and whether the goods have already been shipped. If so, the acquirer/merchant may provide the appropriate shipping information. The online dispute resolution system 10 further makes available an image of the merchant's cancellation or return policy provided via a document function or a comments section in the questionnaire, which may be used to explain the merchant's policy.

When a dispute reason of "returned goods" is given, the online dispute resolution system 10 prompts the issuer to provide the merchandise delivery and return information. The issuer is also able to indicate on the questionnaire whether or not proper disclosure was provided to the cardholder and whether the cardholder had notified the merchant of the cancellation. The online dispute resolution system 10 also allows the acquirer/merchant to specify whether or not the cardholder had been given the merchant's cancellation policy either in writing or verbally. The online dispute resolution system 10 further makes available an image of the merchant's cancellation or return policy via a document function or a comments section of the questionnaire, which may be used to explain the merchant's policy.

The dispute reason for the "quality" dispute group can be one of the following, including, "goods/services not as described or unsuitable" and "goods received but damaged/defective". For this dispute group, the online dispute resolution system 10 requests the user to attach the following document types, if available, including, the merchant's description of the goods or services and 3rd party opinion of goods or services performed.

For the dispute reason of "goods/services not as described or unsuitable", the cardholder or issuer is prompted to provide a description of the goods or services received and an explanation as to why such goods or services do not match the merchant's description. The online dispute resolution system 10 also asks the cardholder or issuer to specify if the merchandise was shipped back to the merchant. If the merchandise was shipped back, then the cardholder or issuer may be prompted to provide the returned goods information. The merchant or acquirer may also specify whether or not the merchant has shipped replacement goods or returned the original goods. If such replacement goods have been shipped, the merchant or acquirer may provide the relevant shipping information. In addition, the merchant or acquirer may be asked to specify whether or not services have been rendered as described. If they have, the merchant or acquirer may further specify the appropriate information, such as, service date and description of the services provided.

For the dispute reason of "goods received but damaged/defective", the cardholder or issuer is prompted to provide a description of the damage and specify if the merchandise was shipped back to the merchant. If the merchandise was shipped back, then the cardholder or issuer may further provide the appropriate returned goods information. The online dispute resolution system 10 also allows the merchant or acquirer to specify whether or not the merchant has received any returned original goods and/or shipped replacement goods. If replacement goods have been shipped, the merchant or acquirer may further provide the appropriate shipping information.

The dispute reason for the "fraud" dispute group can be one of the following, including, "missing signature and/or imprint", "multiple imprint of transaction", "counterfeit card used", "fraudulent non-face-to-face", "transaction appeared on RIS report" and "fictitious account number/no valid card". When the "fraud" dispute group is selected, the online dispute resolution system 10 prompts the issuer to initiate a request for copy for all face-to-face transactions.

Furthermore, for all dispute groups except for fraud and non-receipt of information, the issuer may specify whether services were partially rendered by specifying a dollar ($) amount; also, the online dispute resolution system 10 allows the issuer to indicate on the questionnaire whether or not proper disclosure was provided to the cardholder and whether the cardholder had notified the merchant of the cancellation and provide the merchandise delivery and return information for returned goods or attempted to return goods situations.

The online dispute resolution system 10 automatically fills in certain fields from transaction history records and retains fields from previous transaction activity. Requisite input fields for each dispute group are displayed to the user on the screen for input. The number of requisite input fields is minimized to reduce the amount of data the user has to enter. The online dispute resolution system 10 further provides the capability to allow users to enter free-form or text information.

In addition to capturing information relating to the dispute groups and the dispute reasons, the online dispute resolution system 10 also captures information relating to dispute amount and merchandise delivery and return. Disputed amount may be lower than the original transaction amount. Dispute amount may only exceed the original transaction amount if a credit was posted as a debit or for bundling multiple telephone service transactions under fraud. If the credit was posted as a debit, the amount may not be greater than double the original amount.

The merchandise delivery and return data is used for the following dispute groups: "non-receipt of goods or services", "quality" and "cancelled/returned". The online dispute resolution system 10 prompts the acquirer/merchant to explain if and how the merchandise was shipped. If the merchandise was delivered then the following information is sought from the acquirer/merchant: ship date, delivery address, received date and name of signor. In the event that the merchandise was returned, then the online dispute resolution system 10 prompts the cardholder or issuer to provide the following return information, including, how the merchandise was returned (face-to-face or shipped), returned date or ship date, delivery address, returned merchandise authorization (RMA) number if shipped (if provided) and name of signor. If the merchandise was shipped, either delivered by the merchant or returned by the cardholder, the following shipping information is sought from either the merchant or the cardholder, including, shipment tracking number (generic field that can be used as either a tracking number, reference number, etc.) and shipping company name (from a pick-list USPS, UPS, FedEx, DHL, Other (specify)).

After the relevant information for the chargeback transaction is captured, the online dispute resolution system 10 checks to ensure that chargebacks are only generated under proper conditions. For example, the online dispute resolution system 10 determines if merchandise or service was purchased and when received, for consideration within transaction time limits. The online dispute resolution system 10 also interfaces with the VTRS 18 and exception files, checks address verification and automated referral service indicators and the original amount to ensure authorization-related chargebacks are generated correctly. Upon completion, the chargeback transaction is placed in the corresponding case folder.

With respect to representments, the online dispute resolution system 10 similarly provides field support, document capture, transaction generation checks and other functionality as for chargebacks as described above. Only one representment may be generated, and its CPD is to be within 45 calendar days from the CPD of the chargeback. Furthermore, the representment amount is to be less than or equal to the amount of the chargeback.

Case Filing and Review (Arbitration and Compliance)

If the dispute is not resolved, the online dispute resolution system 10 allows a user to challenge by filing for an arbitration or compliance ruling. Arbitration may be preceded by pre-arbitration. If a chargeback right does not exist, the online dispute resolution system 10 permits a user to challenge by filing for a compliance ruling. Optionally, the online dispute resolution system 10 allows a user to make a pre-compliance attempt before filing for a compliance ruling.

The online dispute resolution system 10 provides various functionality to support pre-arbitration, arbitration, pre-compliance, compliance, and direct compliance features of a case filing.

If a party chooses to pursue pre-arbitration or pre-compliance, the online dispute resolution system 10 automatically monitors the relevant timeframes to ensure that each party receives the correct period of time to respond during the processing of a case. once the appropriate time has expired, or a response is received, the online dispute resolution system 10 allows a case folder to be filed for arbitration or compliance. In one exemplary embodiment, the arbitration and compliance ruling group is a credit card association, such as, Visa.

A filed case is acknowledged and assigned to an analyst or arbiter to review the information and any attached documentation provided by the users. The analyst has a specified period of time to review the case and render a ruling.

As mentioned above, compliance may be preceded by pre-compliance. The online dispute resolution system 10 allows all participating parties to view the contents of the case folder with the objective of resolving the dispute quickly. By using the online dispute resolution system 10, a party may enter various types of information into the questionnaire and include any supporting documentation that supports the pre-compliance dispute. The various types of information include, for example, date of rule violation, date of discovery, date of discovery description (explanation of why date of discovery is being used), rule violated, issuer/acquirer reference number, additional comments (optional) and contact information.

The online dispute resolution system 10 permits the recipient of the pre-compliance action to view all the information provided by the initiator and input the following information in response: credit information (indicates whether or not credit was issued), additional comments (optional), contact information, merchant contact information (if acquirer is responding), cardholder contact information (if issuer is responding). Either party may update their information at any time during the pre-compliance stage until the requesting party has filed the case.

The online dispute resolution system 10 maintains a specified pre-compliance timeframe thereby permitting the other party time to respond to the dispute. Such time frame is typically not less than 30 days. A party cannot file a compliance case until this timeframe has expired or a response has been received.

Similarly, pre-arbitration is originated the same way a chargeback is originated, via the questionnaire process provided by the online dispute resolution system 10.

The party who originated the pre-compliance action is the only one who can file for compliance. Currently, the party receiving the chargeback can file for arbitration with one exception, ATM transactions. The party who initiates the chargeback can file for arbitration after the chargeback/representment cycle has been completed. The online dispute resolution system 10 monitors the proper time periods to ensure that both regional and international regulations have been followed prior to allowing a case to be filed. For parties who wish to separate the functions of preparing a case and filing a case, the online dispute resolution system 10 supports a two-step pre-approval/approval case filing option.

Once a case is filed, no additional, new information may be provided by either party to the case folder unless the analyst requests such information. A grace period begins allowing the other party time to respond to the filing. During the grace period, either party to the case is able to withdraw the case.

An analyst may reject a case for one of a number of reasons including, for example, existence of direct compliance mediation ruling, case filed past time frame, PLUS case reject, incomplete documentation, international case, failure to document a financial loss, direct compliance invalid case, failure to meet compliance requirements, duplicate case, and other specified reasons. Parties are notified of rejected cases via the online dispute resolution system 10 and the initiating party is able to correct and re-file the case within the allowable timeframes.

Once the grace period has elapsed, the online dispute resolution system 10 moves the case folder into the case review stage. The case folder then becomes available to the arbitration and compliance ruling group for a review and ruling to be made.

The online dispute resolution system 10 permits new cases to be assigned either manually or automatically to analysts. Auto-assignment of cases is based on system information indicating that an analyst may have worked on cases for the same cardholder or merchant account previously.

Once the case is filed, the online dispute resolution system 10 allows an analyst to have access to all information in the case folder and add certain case information. The online dispute resolution system 10 uses a set of credit card association regulations to guide an analyst through the review and ruling stage. During the review stage, the analyst may request additional information from either party by sending notifications with requested due dates to a party having access to the online dispute resolution system 10. Parties who do not have access to the online dispute resolution system 10 are notified through e-mail, fax or both. Information exchanged during the case review stage may optionally be opened to both parties at the discretion of the analyst.

Ruling

The analyst may make one of five possible rulings including: in favor of the issuer, in favor of the acquirer, split decision, issuer withdrawal, and acquirer withdrawal. The ruling may be one of the following, including, chargeback is not valid, chargeback past time, missing required documentation, issuer's chargebacks valid, rule violation occurred, rule violation did not occur, committee split the decision, cardholder dispute unreasonable, cardholder dispute reasonable, no third party opinion, case withdrawn by acquirer, case withdrawn by issuer and other.

Comments are included to describe the reason for the ruling. Once a ruling has been made by the analyst, both parties to a dispute are notified of the decision and the fees, penalties and fines levied, if any. Amounts and fees may be divided between the parties to the dispute. The analyst has the discretion to adjust these amounts. Withdrawn cases may be charged to the withdrawing party. In one exemplary embodiments, the online dispute resolution system 10 only permits each party to see its own ruling. Parties to the dispute are responsible for notifying their respective cardholder and merchant of the ruling.

Appeal

The losing party to the dispute may appeal for a re-review of the case within in a specified time period and case dollar value. For example, a ruled case may be appealed within 45 days of the ruling notification date and only if the case amount is equal to or greater than a preset amount, such as, $5000. The online dispute resolution system 10 is capable of maintaining the appeal qualification conditions, such as, the specified time period for appeal and case dollar value, for each decided case. The online dispute resolution system 10 permits a losing party to re-file either arbitration or compliance cases as an appeal. Furthermore, the online dispute resolution system 10 maintains a history of the dispute including the identity of the analyst who decides the dispute. If a ruling is appealed, the online dispute resolution system 10 is capable of automatically assigning the appealed case to the same analyst, to the extent possible, who handled the original dispute.

Good Faith Collection

A party to a dispute may initiate a good faith collection transaction as a final recourse to resolve the dispute when no other rights are available. A good faith collection may occur at any time and will be facilitated, but not regulated, by the online dispute resolution system 10. For example, a party is able to initiate a Good Faith Collection (GFC) from the questionnaire. This optional dispute stage provides a party who has no chargeback, compliance or arbitration rights available an opportunity to resolve a dispute.

Process Flow

Figure 3A:
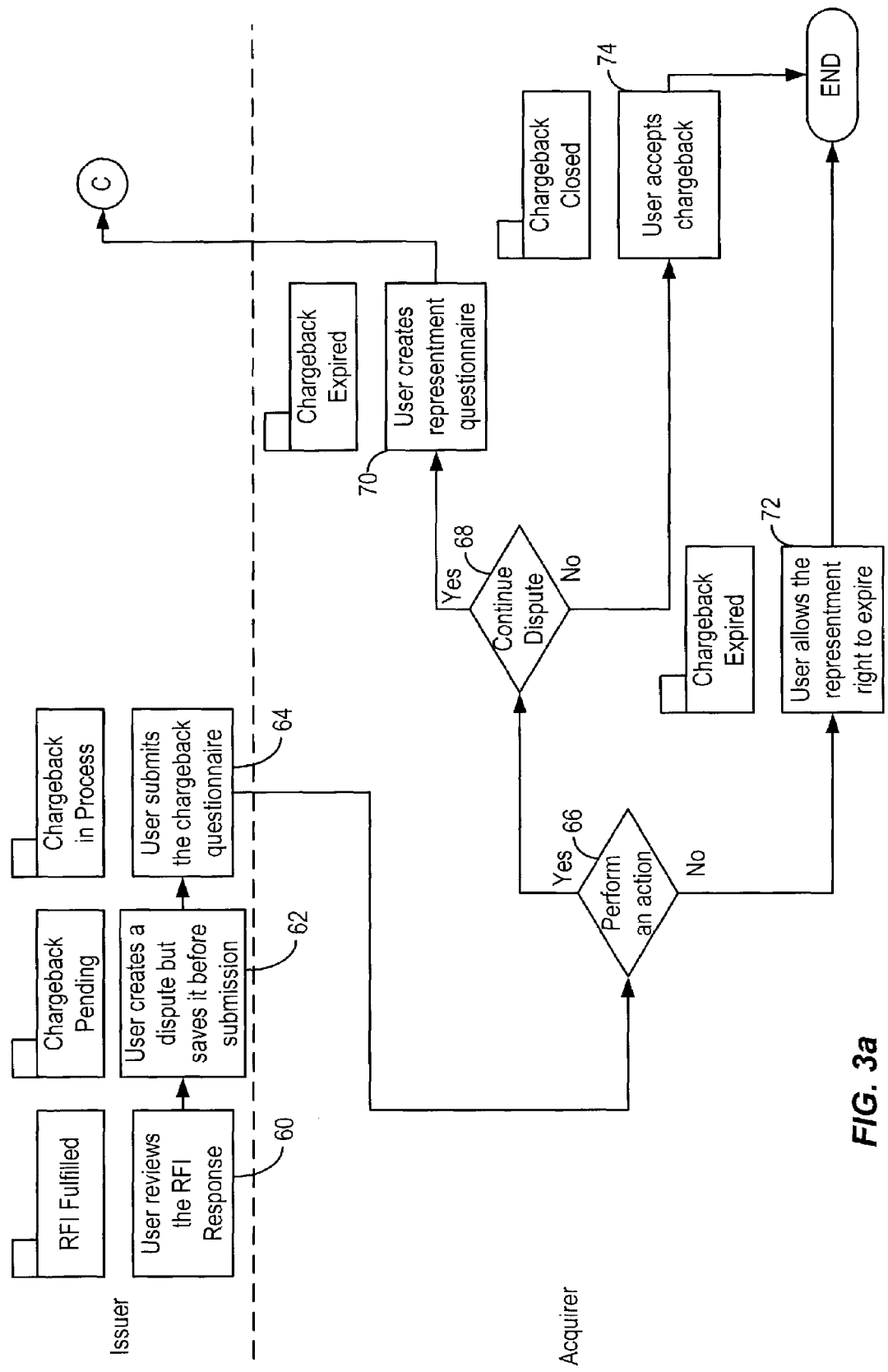
FIGS. 3a and 3b are flow diagrams collectively illustrating an exemplary process flow of an exemplary embodiment of the present invention.
Figure 3B:
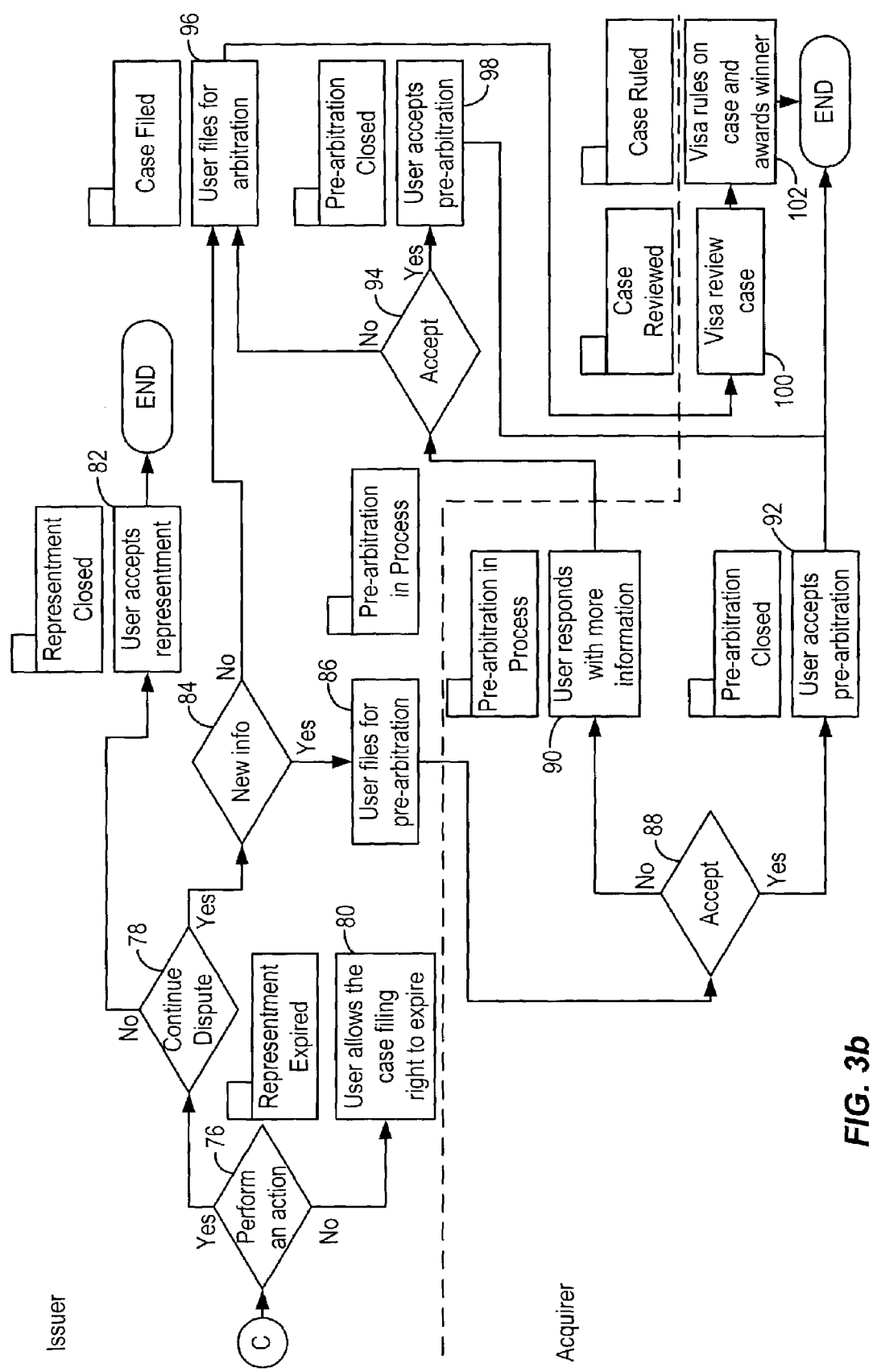

FIGS. 3a and 3b are flow diagrams collectively illustrating an exemplary process flow of the online dispute resolution system 10 in accordance with the present invention. Referring to FIG. 3a, at 60, the issuer reviews the RFI response that is returned during the RFI stage as illustrated in FIG. 2. As described above, a case folder that corresponds to the dispute is created during the RFI stage. At 62, the issuer may start a dispute by completing a questionnaire but choose to save the questionnaire for subsequent submission. At 64, the issuer submits the questionnaire to the online dispute resolution system 10 to initiate a dispute. That is, the issuer initiates the process for a chargeback via the online dispute resolution system 10. At this point, the online dispute resolution system 10 determines if the opposing party should receive the information electronically or by mail. It should be noted that if the process for initiating pre-compliance is similar. At 66, the acquirer receives notification of an initiated dispute for the chargeback, and upon reviewing information in the case folder, the acquirer determines whether to take any appropriate action. If the acquirer decides not to take any action, then at 72, the acquirer simply allows its representment right to expire. Typically, when a chargeback is initiated by an issuer, an acquirer has the right to represent the transaction to the issuer for further evaluation. By allowing the representment right to expire, the acquirer is effectively agreeing not to dispute the chargeback by the issuer.

At 68, in the event that the acquirer decides to take action with respect to the dispute, the acquirer upon reviewing the information in the case folder may via the online dispute resolution system 10 accept the chargeback at 74. The dispute process is concluded when the acquirer decides not to challenge the chargeback. Alternatively, at 70, the acquirer may use the online dispute resolution system 10 to create a representment in the form of a representment questionnaire as part of the case folder.

Referring to FIG. 3b, the online dispute resolution system 10 presents the representment questionnaire to the issuer for evaluation. At 76, the issuer decides whether to take any appropriate action in response to the representment questionnaire. At 80, if the issuer decides not to pursue the dispute, the issuer allows the case filing right to expire; alternatively, the issuer may indicate to the online dispute resolution system 10 that it no longer wishes to proceed with the dispute.

At 78, the issuer decides whether to continue with the dispute. At 82, if the issuer decides not to continue with the dispute, the issuer may simply accept the representment made by the acquirer. By accepting the representment, the issuer is effectively agreed not to proceed with the dispute.

At 84, if the issuer decides to continue with the dispute, the online dispute resolution system 10 then determines whether the issuer has provided new or additional information concerning the dispute. If no new or additional information is added by the issuer, then at 96, the online dispute resolution system 10 permits the issuer to file for arbitration. At 100, once the arbitration is filed, the dispute is forwarded by the online dispute resolution system 10 to the arbitration and compliance ruling group for review. At 102, the arbitration and compliance ruling group rules on the dispute and awards the proper winner.

However, if the new or additional information is supplied by the issuer, then at 86, the online dispute resolution system 10 permits the issuer to file for pre-arbitration. At 88, the acquirer determines whether to accept pre-arbitration. At 90, if the acquirer decides not to accept pre-arbitration, then the online dispute resolution system 10 allows the acquirer to respond to the issuer's new or additional information with its own information. The information submitted by the acquirer is then forwarded by the online dispute resolution system 10 to the issuer for review. The issuer and the acquirer may continue to exchange additional information.

At 94, the issuer decides whether to accept the newly submitted information provided by the acquirer. If the issuer decides not to accept that information, then the online dispute resolution system permits the issuer to file for arbitration at 96. The arbitration process then continues as described above. If the issuer decides to accept the new information from the acquirer thereby accepting pre-arbitration, then at 98, the online dispute resolution system 10 closes the case.

Going back to 88, the acquirer decides whether to accept pre-arbitration filed by the issuer. At 92, the online dispute resolution system 10 allows the acquirer to accept pre-arbitration filed by the issuer and the case is closed.

Process Management

A number of process management and monitoring features of the online dispute resolution system 10 are further described below.

Cardholder/Merchant Services

Issuers may subscribe to some or all of the following services, and offer their cardholders direct access to certain features provided by the online dispute resolution system 10. For example, a cardholder may access information related to a transaction. To get information for a particular transaction, the cardholder needs to input the card account number, transaction date shown on the cardholder's bank statement or receipt and the transaction amount. The online dispute resolution system 10 is able to search for the exact date and amount and also for dates and amounts close to those input. This flexibility accommodates differences in system dates and any possible fees included in the amount. To provide additional security, the online dispute resolution system 10 forwards the search results to an e-mail address provided by the requesting cardholder.

The online dispute resolution system 10 allows users to access information relating to the disputed transaction. The level of access depends on the identity of the user. For example, issuers and acquirers are given access to more information than cardholders and merchants. Furthermore, information may be presented differently to different users depending on their identity. For example, information provided to issuers and acquirers may be more technical, while information provided to cardholders and merchants may be presented in a more easily understood manner. In addition, a substitute draft may be customized by issuers. If more than one transaction has been found, then the substitute draft for each transaction will be returned. If no information is found, the cardholder may try again and also be provided with issuer contact information and possibly an online chat service.

Questionnaire

As mentioned above, the questionnaire is used to gather initial dispute information. The questionnaire can be filled in by a customer service representative of a user (such as, an issuer or acquirer). Alternatively, a cardholder or merchant may use an interface provided by an issuer or acquirer to provide the requisite information. The requisite information is then passed onto the online dispute resolution system 10. Additions to the original questionnaire are time stamped and added to the case folder to create a case history.

A user may attach one or more supporting documents with the questionnaire. A list of recommended documents to be included for each dispute group is displayed. If a document is to be attached to the questionnaire, the online dispute resolution system 10 allows the user to provide a text description for each document.

Information added to the questionnaire is accumulated and does not replace previously submitted information or documents in order to provide a proper audit trail. When the user has completed inputting information into the questionnaire, the online dispute resolution system 10 displays a message prompting the user to acknowledge and confirm the accuracy of the information in the questionnaire.

The dispute date is the date the questionnaire is submitted. A user message text field is provided to allow the user to have capability to supply any additional comments regarding the dispute. The use of this user message text field may be restricted to selected users depending on their identity. Also, whenever possible, the questionnaire may be automatically populated from case folder information.

The online dispute resolution system 10 permits case folders to be grouped and worked on together. Case folder grouping is done if the dispute is for the same issuer, dispute group and reason. For example, when a merchant has processed a single purchase as multiple transactions, these multiple transactions can be disputed as a group. Conversely, an acquirer can group together a response for the same dispute group and reason to multiple issuers.

Imaging/Documentation Management

The online dispute resolution system 10 facilitates the process of managing any and all supporting documents relating to a disputed transaction and does so in a way that suits the user's business process. The online dispute resolution system 10 is designed to be able to receive a variety of typical dispute supporting documentation including, for example, transaction receipt (sales draft), credit receipt, refund acknowledgment, cardholder letter, merchant letter, 3rd-party opinion, picture, merchant's goods/service description, merchant's return/cancellation instructions, proof of delivery, shipment letter, dispute questionnaire, transaction log (ATM), issuer certification, acquirer certification, Visa certification, authorization logs and certificate.

The supporting documentation can be provided to the online dispute resolution system 10 in a number of ways. For example, the documents can be attached at the point of initiating a dispute. Alternatively, the online dispute resolution system 10 offers a facility for bulk image upload. Using this facility, large number of documents can be examined and assigned/added to their corresponding case folders. Documents may be faxed, scanned or emailed into the online dispute resolution system 10.

Documents may be added into a case folder for a party's own reference and may also become an attachment to a case folder so that other parties may review it. Documents may be moved or copied from one folder to another, added to other folders or deleted. Once a case is filed for review by the arbitration and compliance ruling group, only documents requested by the arbitration and compliance ruling group may be attached to the case.

Communication Services

The online dispute resolution system 10 provides a number of different facilities to allow users to communicate with one another as well as with other parties. For example, the online dispute resolution system 10 allows users to communicate with parties who are not on the online dispute resolution system 10 through certain interfaces, such as, email, fax, and other type of gateway device. If an e-mail or fax number is not available for a user, the online dispute resolution system 10 accordingly instructs the sender to print and mail the document. All physical and electronic address information is maintained by the online dispute resolution system 10.

Fraud Reporting

The online dispute resolution system 10 further facilitates the process of fraud reporting by users. The online dispute resolution system 10 provides acquirers with alerts, high-risk merchant reporting and an online best practices guide against fraud. The online dispute resolution system 10 further provides acquirers the ability to permit a merchant to have access to all fraud data filed against that merchant. The online dispute resolution system 10 is designed to provide alerts or early warnings of potential fraud activities to issuers and acquirers. Queries and search features are provided to detect different types of fraud activity. These features provide information on a number of items including, for example, fraud trends, excessive chargeback patterns, identification of cardholders disputing similar transactions, credit to transaction ratios, clearing and fraud information not on neural nets, activity below floor limit, and correct use of POS entry mode. Users may specify the exact conditions for receipt of fraud alerts. The online dispute resolution system 10 tracks all disputes and generates a merchant fraud score on request for an acquirer's merchant. High-risk merchant reports are also available to provide reporting by risk category such as key entry, non-fulfillment, complaints, data integrity, and chargebacks. The online dispute resolution system 10 also provides acquirers with aggregate data on their activities for use in monitoring the data integrity of their merchants.

The online dispute resolution system 10 includes a number of interfaces that can be used to communicate with external fraud sources or systems. Such external fraud sources include, for example, risk identification service (RIS), technology partners that specialize in developing fraud information, OASIS (merchant performance monitoring data), CRIS online, convenience check fraud reporting, and Better Business Bureau interface. Fraud information received from these external fraud sources or systems may then be integrated or incorporated for reporting or review by users of the online dispute resolution system 10.

The online dispute resolution system 10 further provides an interface with RIS so that issuers are able to chargeback one or more transactions from the RIS report. Issuers are also able to update the exception file online via the online dispute resolution system 10.

In connection with the fraud services being offered by the online dispute resolution system 10, the online dispute resolution system 10 maintains sets of security and privacy rules that allow issuers to collaborate on fraud detection and related investigation activities when a cardholder has Visa and non-Visa cards from multiple issuers. Each issuer is able to set its own policy rules to define what fraud information it will or will not share with other issuers. The online dispute resolution system 10 allows issuers to dynamically request and authorize, on a case-by-case basis, another issuer to view all or portions of its data during an investigation phase. Issuers are also able to link to each other's case folders when they are involved in a cross-issuer fraud dispute and search for multiple disputes from one cardholder across several issuers. Exchanges of all fraud prevention information between issuers are tracked by the online dispute resolution system 10.

Feedback, Reporting and Monitoring

The online dispute resolution system 10 is designed to provide a wide range of standardized reports that are highly customizable by users. An ad hoc reporting capability is also available. Reports are available at both detail and summary levels and may be tailored by level of reporting (e.g. BIN level or a group of Bins), filtered, sorted, date range and content to meet individual user needs and preferences. Reports may be viewed on the screen, printed and exported. To ensure confidentiality, the online dispute resolution system 10 only allows users to see and access their own information. In order to minimize user time required to run reports, the online dispute resolution system 10 utilizes a report scheduler that manages the execution of all regularly scheduled reports. Scheduler features allow a user to set up the necessary parameters of the report, schedule the run, and delivery options. Reports may be delivered via file transfer, e-mail, or fax.

Users of the online dispute resolution system 10 are able to obtain reports on various categories of interest. The various categories and reports for each category are further described below.

Through the online dispute resolution system 10, users are able to request incoming and outgoing transaction reconciliation reports to analyze settlement activity. These reconciliation reports include incoming and outgoing reconciliation summary and detail reports which provide transaction counts and amounts for a specified settlement; incoming case action report that lists all incoming case actions for one or more transaction types (i.e., chargebacks, representments, request for copies, case filings, case rulings, good faith collections); accepted transaction report that provides counts and amounts for accepted exception items and their respective resolution (e.g. 'post to cardholder', 'charge against merchant account', 'resolve with issuer'); exception manager returns report that provides line item detail and reasons for transactions created by the online dispute resolution system; and exception file update report that lists all exception file updates and changes made for the selected date range.

Another category of reports that are also available to users of the online dispute resolution system 10 includes, for example, case filing and ruling reports that provide users statistical information for all their cases that are pending a ruling or are closed; arbitration, compliance and direct compliance dispute resolution summary and detail reports for closed arbitration and compliance cases reporting information, such as, percentage of withdrawals, wins, losses, rejects, and splits for issuers and acquirers, fees assessed for the cases and a comparison of system-wide performance; mediation report that provides case counts by type of ruling, percentage of issuer wins versus acquirer wins and system-wide percentage of wins. Other administrative reports are also available to administrators of the online dispute resolution system 10 including, for example, case filing and ruling daily report that provides summaries for each day of all cases filed and rulings received; case detail report that provides information (e.g. questionnaire data, documents) contained in one or more case folders; and case review monthly report that provides status by analyst of all cases in process or in review.

As the online dispute resolution system 10 monitors the corresponding dispute life cycles of pending cases, case life cycle reports are generated to alert parties to the status of cases that are waiting for the next action to be taken. Such case life cycle reports include, for example, outstanding transaction report that provides issuers using the two-step case filing procedure, pre-approval and approval, a count and amount of transactions that have been created and are awaiting approval; suspense activity report that lists error codes and return reasons for transactions that have been rejected, returned or held over; and aging report that lists all open cases with time remaining before next action can be taken or folder is automatically closed.

The online dispute resolution system 10 also produces reports on service usage and productivity. Service usage and productivity reports provide information to evaluate and improve operator productivity and performance. Cardholder and merchant activity is available in this set of reports and a summary of fees and charges assessed upon dispute resolution. These reports include, for example, operator and group productivity reports that provide counts for worked items (e.g. requests for copy, transactions initiated, closed, fulfilled, completed questionnaires, merchants serviced/terminated, etc.) by operator or group of operators; cardholder activity report that provides detail and summary activity by cardholder; merchant activity report that provides detail and summary activity by merchant; service fees and charges report that provides detail and summary counts and amounts for all fees and charges by dispute transaction type; and system performance report that supports system performance tuning by providing minimum, average and maximum response times for each service action.

Information on administrative or operational changes to the online dispute resolution system 10 can also be reported. Audit and activity reports provide an audit trail of who made what changes and when the changes were made. These reports include, for example, operator change report that provides an audit trail of changes to operator profiles; service change report that provides an audit trail of changes to user service profiles; user configuration change report that provides an audit trail of changes to user profiles, BIN group change report that provides an audit trail of changes to BIN groupings; and event log report that provides significant errors or events for prior 90 days at user level.

It should be understood that the present invention may be implemented in the form of control logic using software, hardware, or a combination of both, in a modular or integrated manner. The present invention can be implemented as a stand-alone system or as part of a larger computer system. Based on the disclosure provided herein, a person of ordinary skill in the art will know of other ways and/or methods to implement the present invention.

It should also be understood that while an exemplary embodiment of the present invention as described herein is directed to a system which may be used in the credit card industry, it will be appreciated by a person of ordinary skill in the art that the present invention is applicable for use in other types of industries as well.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A payment transaction dispute system for facilitating payment transaction disputes, comprising:
    a storage system storing transactional information relating to a plurality of transactions; and
    a dispute resolution system interacting with the storage system, wherein a first user retrieves and reviews information relating to a transaction involving the first user and a second user, and initiates a dispute with the second user using the dispute resolution system, wherein the transaction is thereafter a disputed transaction;
    wherein some or all of the retrieved information relating to the disputed transaction is stored by the dispute resolution system in a case folder, the case folder being used to store only information relating to the disputed transaction;
    wherein upon receiving indication that the dispute is initiated, the dispute resolution system creates a questionnaire and presents the questionnaire to the first user in order to capture information relating to the disputed transaction from the first user; and
    wherein the dispute resolution system attaches the questionnaire to the case folder and monitors the case folder to track timeframes and alert the first and second users with regard to actions that are to be completed by the first and second users as part of a resolution process for resolving the disputed transaction.

2. The payment transaction dispute system of claim 1 wherein the dispute resolution system is further configured to allow the second user who is a party to the disputed transaction to provide information relating to the disputed transaction upon receiving indication that the dispute is initiated.

3. The payment transaction dispute system of claim 1 wherein the dispute resolution system is further configured to provide an arbiter access to the information maintained in the case folder to allow the arbiter to resolve the dispute between the first user and the second user.

4. The payment transaction dispute system of claim 1 wherein the dispute resolution system is further configured to examine the information relating to the disputed transaction contained in the case folder to determine whether the initiated dispute is authorized.

5. The payment transaction dispute system of claim 4 wherein the information relating to the disputed transaction contained in the case folder includes information on whether an attempt to resolve the disputed transaction has been undertaken.

6. An electronic dispute resolution system for facilitating credit card transaction disputes, comprising:
    control logic allowing a first party to review information relating to a credit card transaction;
    control logic allowing the first party to initiate a dispute with respect to the credit card transaction with a second party, wherein the credit card transaction is thereafter a disputed credit card transaction;
    control logic creating a questionnaire to collect information from the first party upon initiation of the dispute and attach the questionnaire with collected information to a case folder;
    control logic monitoring the case folder to track timeframe and send alerts to the first and second users with regard to actions that are to be completed by the first and second users as part of a resolution process for resolving the dispute; and
    control logic outputting the alerts to computing devices operated by the first and second users.

7. The electronic dispute resolution system of claim 6 further comprising:
    control logic configured to process an information request from the first party in order to retrieve information related to the disputed credit card transaction; and
    control logic configured to create the case folder upon processing the information request and include the retrieved information in the case folder.

8. The electronic dispute resolution system of claim 6 further comprising:
    control logic configured to determine whether the first party initiated the dispute.

9. The electronic dispute resolution system of claim 8 further comprising:
    control logic configured to determine whether an attempt to resolve the dispute has been undertaken.

10. The electronic dispute resolution system of claim 6 wherein there are one or more access levels to the case folder; and
    wherein the first party and the second party have different access levels to the case folder.

11. The electronic dispute resolution system of claim 6 further comprising:
    control logic configured to track timeframes and actions that are applicable to an attempt to resolve the dispute.

12. The electronic dispute resolution system of claim 6 further comprising:
    control logic configured to allow the first party and the second party to resolve the dispute via pre-arbitration or pre-compliance.

13. The electronic dispute resolution system of claim 6 further comprising:
    control logic configured to check the case folder to determine if the first party is allowed to file for arbitration or a compliance ruling; and
    control logic configured to allow the first party to file for the arbitration or the compliance ruling.

14. A payment transaction dispute system for facilitating payment transaction disputes, comprising:
    a storage system configured to store transactional information relating to a plurality of reported transactions; and
    a dispute resolution system, wherein a plurality of users resolve disputes corresponding to respective reported transactions with one another using the dispute resolution system, the dispute resolution system
    interacting with the storage system such that users in the plurality of users retrieve and review information relating to respective reported transactions in the plurality of reported transactions to initiate disputes, wherein the retrieved information relating to the respective reported transactions is stored in corresponding case folders, each case folder being used to store only information relating to a specific reported transaction,
    creating a questionnaire and presenting the questionnaire to a first user, upon receiving indication that a first dispute is initiated by the first user relating to a first reported transaction with a second user, wherein the questionnaire is used to capture information relating to the first reported transaction from the first user, and attaching the questionnaire to the corresponding case folder relating to the first reported transaction and monitoring the corresponding case folder relating to the first reported transaction to track timeframes and alert the first and second users with regard to actions that are to be completed by the first and second users as part of a resolution process for resolving the first dispute.

15. The payment transaction dispute system of claim 14 wherein the dispute resolution system is further configured to allow the first user and the second user to have access to the information maintained in the corresponding case folder relating to the first reported transaction.

16. The payment transaction dispute system of claim 15 wherein the first user and the second user are given different access rights to the information maintained in the corresponding case folder relating to the first reported transaction.

17. The payment transaction dispute system of claim 14 wherein the dispute resolution system is further configured to provide an arbiter access to the information maintained in the corresponding case folder relating to the first reported transaction to allow the arbiter to resolve the first dispute between the first user and the second user.

18. A method for facilitating payment transaction disputes using a dispute resolution system, the method comprising:

storing transactional information relating to a plurality of transactions;

receiving a request from a first user for information relating to a transaction in the plurality of transactions;

outputting information relating to the transaction to the first user, wherein the first user initiates a dispute with a second user, and wherein the transaction is thereafter a disputed transaction;

storing some or all of the retrieved information relating to the disputed transaction in a case folder, the case folder being used to store only information relating to the disputed transaction;

creating a questionnaire and presenting the questionnaire to the first user;

receiving a response to the questionnaire including information relating to the disputed transaction from the first user;

attaching the response to the questionnaire to the case folder;

monitoring the case folder to track timeframes; and alerting the first and second users with regard to actions that are to be completed by the first and second users as part of a resolution process for resolving the disputed transactor based on the timeframes.

19. The method of claim 18 further comprising receiving, from the second user who is a party to the disputed transaction, information relating to the disputed transaction upon receiving indication that the dispute is initiated.

20. The method of claim 18 further comprising monitoring a timeframe with respect to a pre-compliance or pre-arbitration before the disputed transaction is permitted to move into compliance or arbitration.

* * * * *